Oct. 9, 1945.	R. S. WEBSTER ET AL	2,386,415
TREATING TANK
Filed Sept. 27, 1944	2 Sheets-Sheet 1
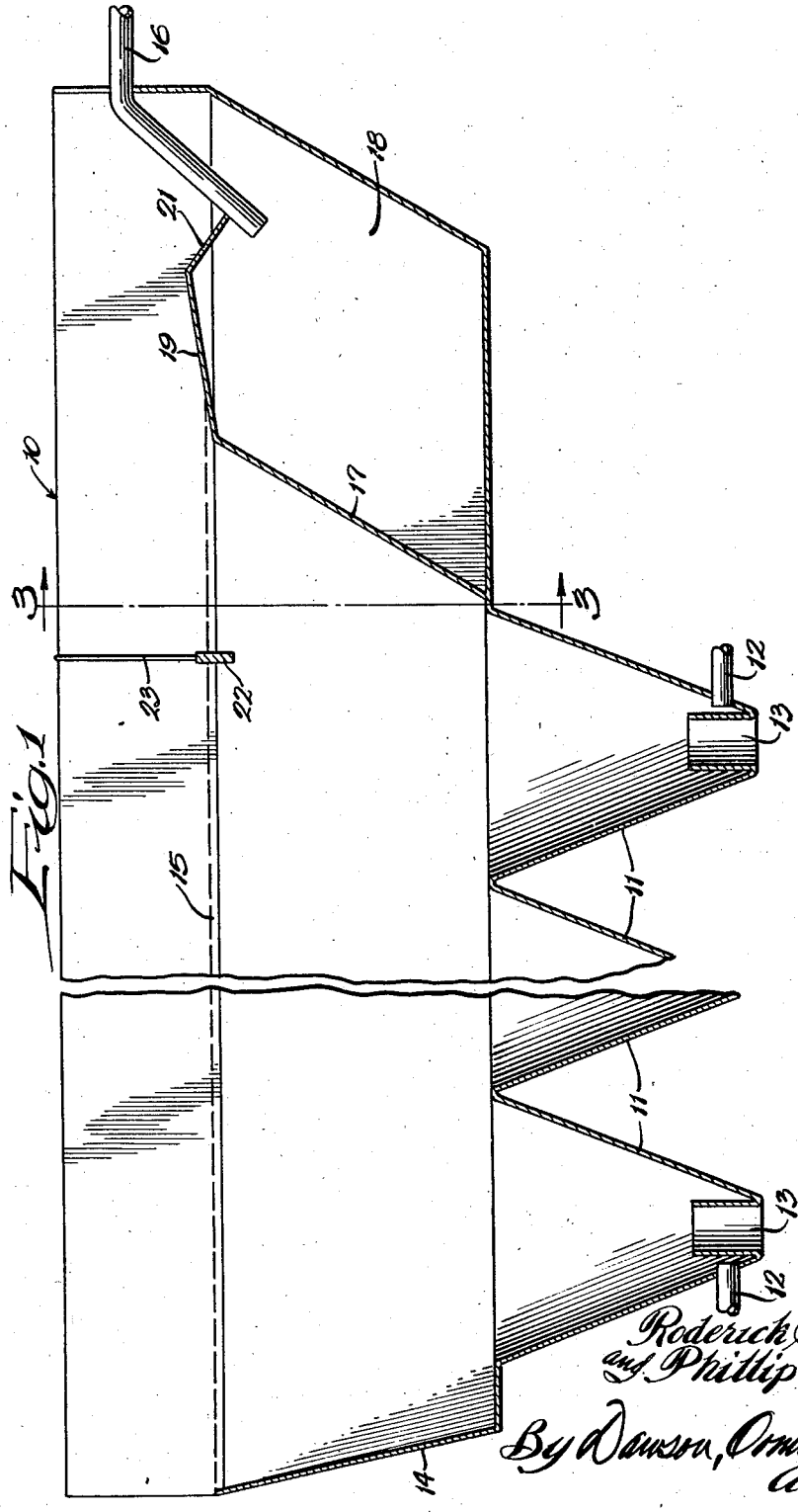

Oct. 9, 1945.  R. S. WEBSTER ET AL  2,386,415
TREATING TANK
Filed Sept. 27, 1944  2 Sheets-Sheet 2
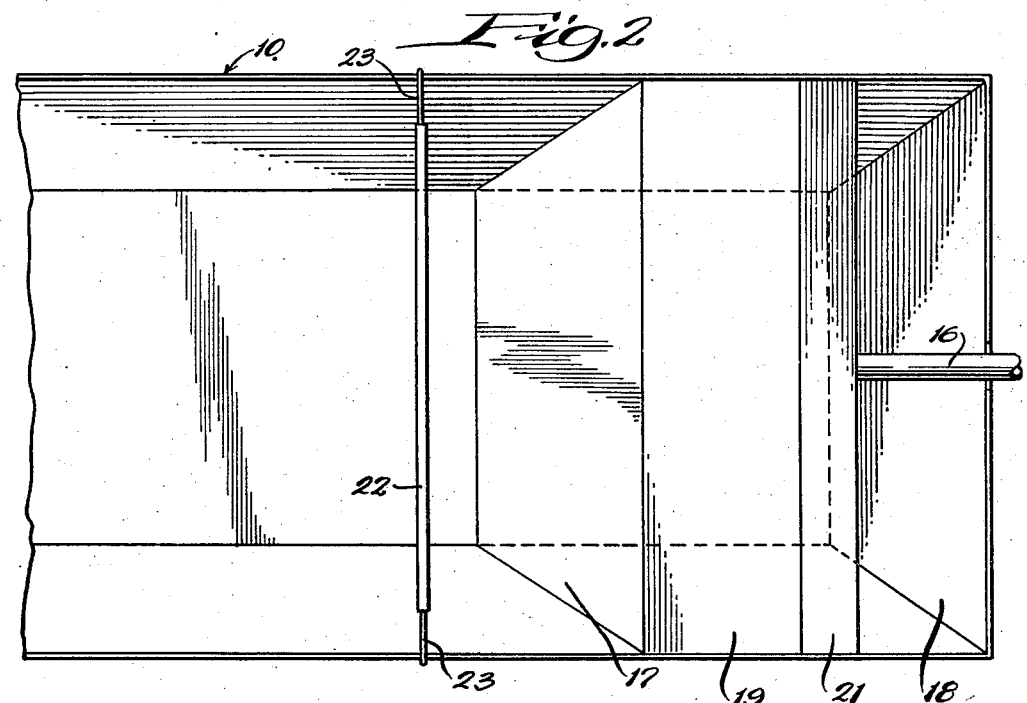
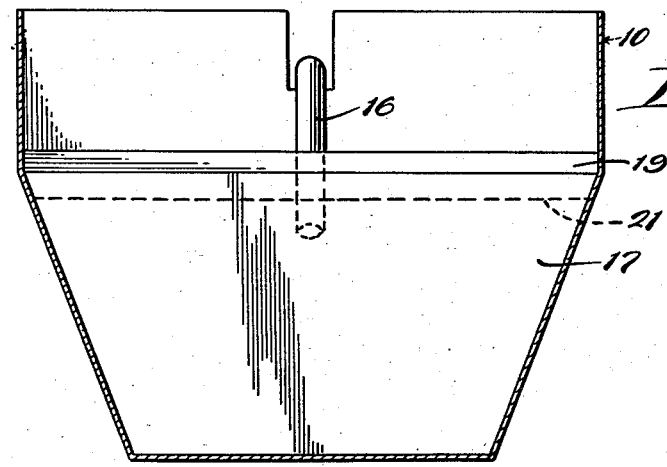
Inventors:
Roderick S. Webster
and Phillip C. Will,
By Dawson, Ooms and Booth,
Attorneys.

Patented Oct. 9, 1945

2,386,415

UNITED STATES PATENT OFFICE 2,386,415

TREATING TANK

Roderick S. Webster, Evanston, and Phillip C. Will, Oak Park, Ill., assignors to The Hydro-Blast Corporation Application September 27, 1944, Serial No. 556,070

5 Claims. (Cl. 209—155)

This invention relates to treating tanks and more particularly to apparatus for separating or classifying solid materials from a mixture of liquids and soluble solids.

Various types of treating tanks have been used for settling and classifying solids carried by liquids, as for example in the settling or classifying of sands from a slurry of sand and water.

In the use of such apparatus it has been difficult to obtain accurate and economical settling or classification due to agitation of the liquid in the tanks resulting from flow therethrough. Such agitation tends to produce eddy currents causing uneven settling and classification.

The ideal situation in a tank of this character is one in which flow from the inlet to the outlet of the tank is uniform throughout the full tank cross section. Under such flow conditions very accurate and uniform settling or classification can be produced. It is, accordingly, one of the objects of the present invention to provide a treating tank in which flow conditions approach the ideal.

Another object of the invention is to provide a treating tank in which the mixture of liquid and solids is received in an entrance chamber formed by a transverse partition in the tank.

Still another object is to provide a treating tank in which the mixture entering the tank flows over a sloping plate on which the kinetic energy of the flowing mixture is largely dissipated.

A further object of the invention is to provide a treating tank in which the entering mixture flows from an entrance chamber over an upwardly sloping inlet plate and a downwardly sloping beach plate into the tank.

The above and other objects and advantages of the invention will be more readily apparent from the following description when read in connection with the accompanying drawings, in which:

Figure 1 is a longitudinal section of a treating tank embodying the invention,

Figure 2 is a partial plan view, and

Figure 3 is a section on the line 3—3 of Figure 1.

The invention is illustrated in connection with an upflow type of liquid classifier, including a generally rectangular tank 10 having in its bottom a series of classifier cones 11 to which water is supplied through pipes 12. Heavy solids carried in suspension in the liquid in the tank will settle into the classifier cones and flow through openings 13 in the bottom thereof with a portion of the liquid from the tank. The lighter solids which cannot sink through the rising current of water in the classifier cones will be carried out a weir plate 14 at the disharge end of the tank. The weir plate 14 establishes the desired liquid level in the tank as indicated by the dotted line 15.

The mixture of liquid and insoluble solids to be classified enters the tank through an inlet pipe 16 terminating in a discharge end sloping downwardly and inwardly into the tank. A partition 17 extends across the tank inwardly of the inlet pipe and slopes upwardly at an acute angle to the vertical toward the inlet pipe, terminating below the normal liquid level in the tank. The partition forms an inlet chamber 18 into which the mixture of liquids and solids discharges and from which the mixture flows over the partition into the main portion of the tank.

In order to provide smooth and even flow of liquids into the tank to minimize eddy currents and other flow disturbances, a beach plate 15 is provided connected at its inner edge to the upper edge of the partition and sloping upwardly toward the inlet pipe at an acute angle to the vertical. The beach plate extends at its upper edge above the normal liquid level in the tank and is connected to an inlet plate 21 which slopes downward toward the inlet pipe at an acute angle to the horizontal. In operation mixture supplied to the inlet chamber 18 is highly agitated therein to maintain the solids in suspension and flows over the inlet plate 21 and beach plate 19 into the main portion of the tank.

We have found that the angles and locations of the beach plate and inlet plate for proper results are quite critical. The beach plate, for example, must be so located that the liquid in the tank will normally extend over its lower end to provide a wedge shaped body of liquid. This plate, furthermore, must be at such an angle that the solids will not drop from the liquid on the surface of the plate and that the mixture will not flow too rapidly down the plate into the tank. When the angle and location of the plate are properly selected, mixture flowing over the upper edge thereof flows smoothly across the plate without dropping any solids and strikes the wedge shaped body of liquid overlying the lower edge of the plate. At this point the kinetic energy in the flowing liquid is largely dissipated so that it moves smoothly into the main body of the liquid in the tank without creating eddy currents or other flow agitation. It will be noted that the existing level in the tank, and consequently the level above the lower edge of the beach plate, will vary in accordance with the rate of flow into the tank, but this is desirable since a larger body of liquid on the beach plate is necessary to dissipate the energy of rapidly flowing liquids than of those flowing slower. Our experiments have indicated that the most desirable results can be obtained when the beach plate 19 lies at an angle of approximately 9° to the horizontal and when the normal water level in the tank is approximately one and one-half inches above the lower edge of the beach plate.

The angle of the inlet plate 21 is also important to produce a smooth, even flow. If this plate is too nearly vertical the mixture from the inlet chamber 18 flows over it in uneven surges or pulses, while if it is too nearly horizontal solids tend to deposit on it, interfering with proper flow. We have found that the most satisfactory results are obtained when this plate lies at an angle of approximately 36° to the horizontal. At this angle no solids will deposit on the inlet plate and the mixture from the inlet chamber flows smoothly over it onto the beach plate.

Where the flow through the tank is relatively rapid there is a tendency to create strong surface currents from the inlet toward the outlet end of the tank which may carry over some of the material it is desired to settle or classify. To avoid this a transverse baffle 22 may be placed in the tank as by suspending it from hooks 23, hooking over the edges of the tank. The baffle 22 is relatively narrow so that it projects only slightly below the liquid level in the tank. When this baffle is employed, it breaks up any tendency toward direct surface currents and assists in obtaining the desired uniform flow across the full section of the tank.

With the construction of the present invention flow of mixture to the tank is uniform with a minimum of eddy currents or other agitation of the liquid, so that accurate classification of solids can be obtained. While one embodiment of the invention has been shown and described in detail, it will be understood that this is illustrative only and is not to be taken as a definition of the scope of the invention, reference being had for this purpose to the appended claims.

What is claimed is:

1. In a treating tank for treating a mixture of liquid and insoluble solids, a mixture inlet pipe discharging downwardly and inwardly of the tank at one end thereof, a partition extending transversely across the tank inward of the inlet pipe, a beach plate connected to the partition lying at an acute angle to the horizontal and sloping downward from said one end of the tank with its lower edge below the normal liquid level in the tank, and an inlet plate secured to the upper edge of the beach plate and sloping downwardly at an acute angle to the horizontal toward said one end of the tank, the inlet pipe discharging below the inlet plate.

2. In a treating tank for treating a mixture of liquid and insoluble solids, a mixture inlet pipe discharging downwardly and inwardly of the tank at one end thereof, a partition extending transversely across the tank inward of the inlet pipe, a beach plate connected to the partition lying at an acute angle to the horizontal and sloping downward from said one end of the tank with its lower edge below the normal liquid level in the tank, and a transverse baffle plate in the tank spaced inward from the partition and beach plate and terminating at its lower edge slightly below the normal liquid level in the tank.

3. In a treating tank for treating a mixture of liquid and insoluble solids, a mixture inlet pipe discharging downwardly and inwardly of the tank at one end thereof, a transverse partition in the tank inward of the inlet pipe and sloping downward at an acute angle to the vertical away from said one end and terminating at its upper edge below the normal liquid level in the tank, a beach plate secured at one edge to the upper edge of the partition and sloping upward therefrom at an acute angle to the horizontal toward said one end of the tank, and an inlet plate secured to the upper edge of the beach plate and sloping downward at an acute angle to the horizontal toward said one end of the tank.

4. In a treating tank for treating a mixture of liquid and insoluble solids, a mixture inlet pipe discharging downwardly and inwardly of the tank at one end thereof, a transverse partition in the tank inward of the inlet pipe and sloping downward at an acute angle to the vertical away from said one end and terminating at its upper edge below the normal liquid level in the tank, a beach plate secured at one edge to the upper edge of the partition and sloping upward therefrom at an acute angle to the horizontal toward said one end of the tank, an inlet plate secured to the upper edge of the beach plate and sloping downward at an acute angle to the horizontal toward said one end of the tank, and a transverse baffle in the tank inward of the partition terminating at its lower edge slightly below the normal liquid level in the tank.

5. In a treating tank for treating a mixture of liquid and insoluble solids, a mixture inlet pipe discharging downwardly and inwardly of the tank at one end thereof, a transverse partition in the tank inward of the inlet pipe and sloping downward at an acute angle to the vertical away from said one end and terminating at its upper edge below the normal liquid level in the tank, a beach plate secured at its inner edge to the upper edge of the partition and sloping upward therefrom at an angle of approximately 9° to the horizontal toward said one end of the tank, and an inlet plate secured to the upper edge of the beach plate and sloping downward at an angle of approximately 36° to the horizontal toward said one end of the tank.

RODERICK S. WEBSTER.
PHILLIP C. WILL.